March 26, 1929. E. F. MAAS 1,706,626
BAND BUILDING MACHINE
Filed March 21, 1925  2 Sheets-Sheet 1

INVENTOR
Elov F. Maas,
BY
ATTORNEY

March 26, 1929.  E. F. MAAS  1,706,626
BAND BUILDING MACHINE
Filed March 21, 1925  2 Sheets-Sheet 2
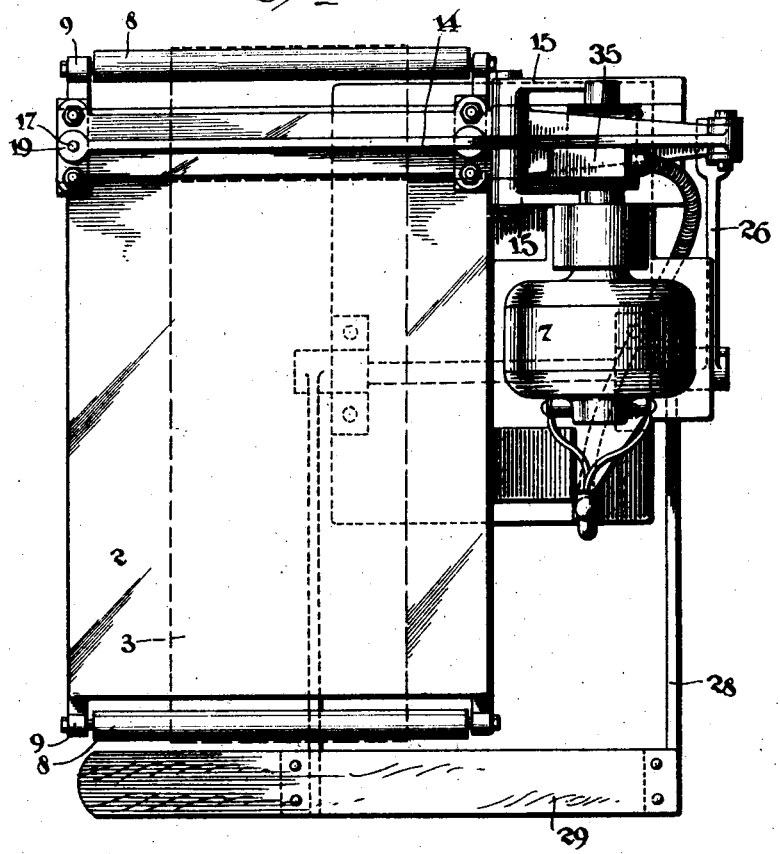
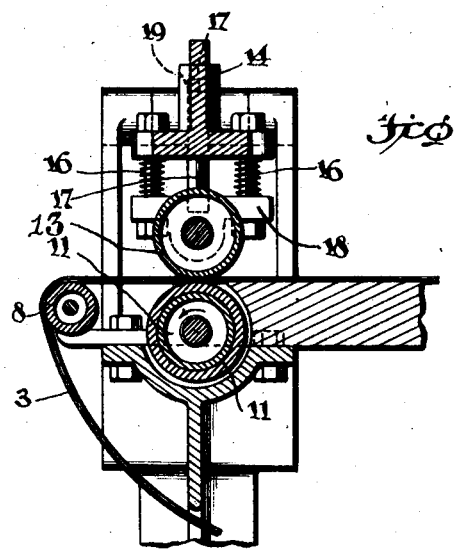
INVENTOR
Elov F. Maas,
BY
ATTORNEY Patented Mar. 26, 1929.

1,706,626

UNITED STATES PATENT OFFICE.

ELOV F. MAAS, OF AKRON, OHIO, ASSIGNOR TO THE GOODYEAR TIRE & RUBBER COMPANY, OF AKRON, OHIO, A CORPORATION OF OHIO.

BAND-BUILDING MACHINE.

Application filed March 21, 1925. Serial No. 17,367.

My invention relates to a method of and machine for tire manufacture and it is particularly related to the building of bands of treated fabric commonly utilized in the construction of pneumatic tires.

One object of my invention is to provide a machine which may be advantageously employed in stitching or uniting the ends of a plurality of superimposed plies to form an endless band.

Another object of my invention is to provide a method of making bands from strips having a plurality of superimposed units.

Heretofore it has been customary to wind joined strips of rubberized fabric on "liner rolls", or to lay single strips between leaves of fabric of a non-adhesive character, the latter assembly being commonly known in the art as "books". Exact lengths are then measured off and individually superimposed and joined to form the endless bands.

According to my invention it is unnecessary to "line" the fabric nor is it necessary to build the band by superimposing individual strips of fabric and gum. Instead, a plurality of continuous strips of fabric and rubber are arranged in superimposed alignment and definite lengths are detached. Then with the aid of my machine, the free ends may be united to form a tire band. It will be seen that this procedure eliminates a great deal of manual labor, and materially reduces the number of operations.

For a better understanding of my invention, reference may be had to the accompanying drawings which illustrate a machine designed to accomplish the objects of my invention:

Fig. 2 is a plan view of the machine; and

Fig. 3 is a cross-sectional view on a larger scale, of the free ends of stitcher and pressure rolls in engaging position.

Figure 1:
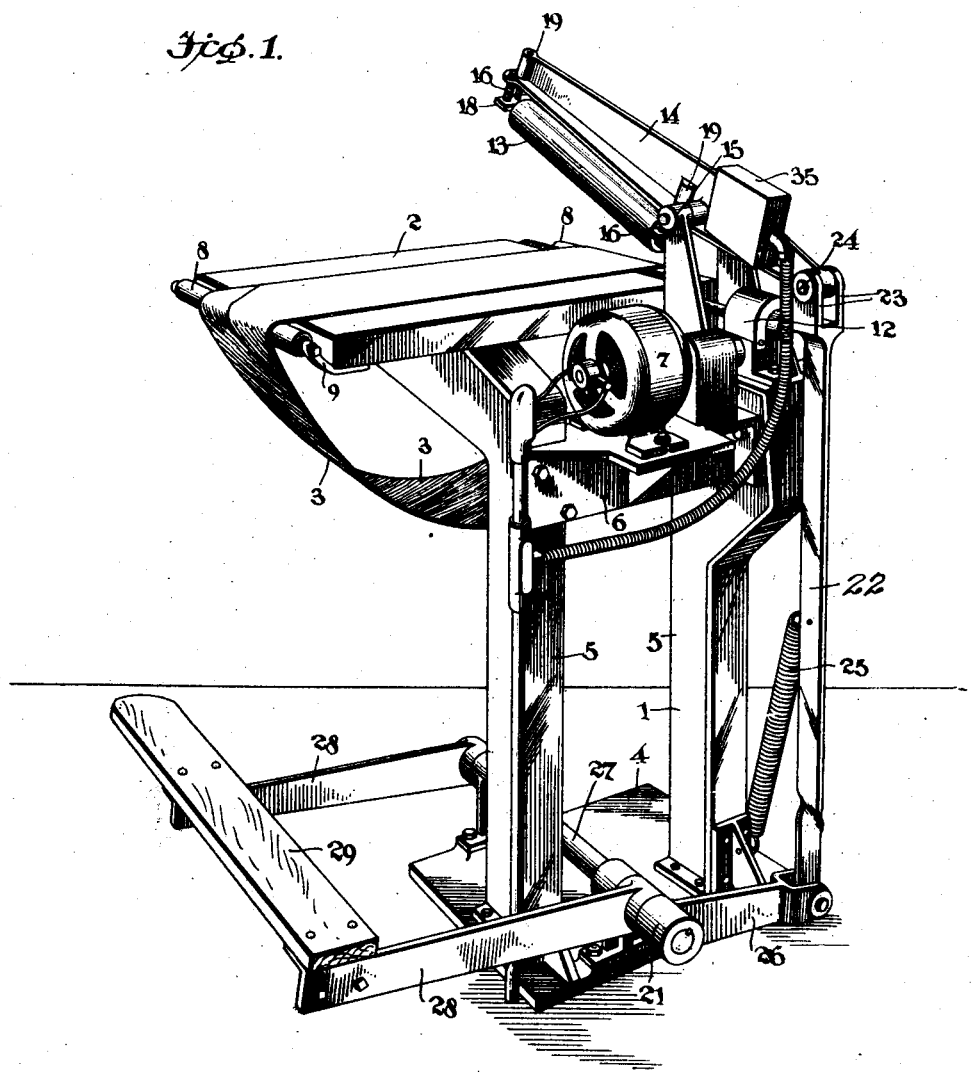
Fig. 1 is a perspective view of the machine showing a pressure roll thereof in removed position.

In its essentials, the machine comprises a suitable frame 1, upon which are mounted means 2 for supporting a band 3 and a set of rolls, which when engaged and rotated as shown in Fig. 3, cause the formation of a union between the ends of the strip forming the band.

The frame consists of a base 4 to which a plurality of uprights members 5 are bolted, which carry the means 2 for supporting the band. A suitable cross-member 6 rigidly mounted upon the members 5 provides a base for a motor 7.

The band support 2 includes a table top provided with an idler roll 8 at opposite ends thereof to facilitate a circumferential movement of the band. The rolls are mounted at either end between brackets 9 which hold them substantially tangent to the surface of the table 2.

A stitcher roll 11, also tangent with the table surface, is journaled at both ends in the frame and is driven by the motor 7 through a speed reducing mechanism 12. The surface of the roll may be corrugated in order to insure a good frictional drive between it and a pressure roll 13, which is suspended on a lever arm 14 pivotally mounted between brackets 15. The roll 13 is resiliently mounted on the arm and is held in position by pins 17 and bolts fitted with spring recoils 16. With this arrangement any downward pressure of the arm must be transmitted to the roll through the springs which will equalize the force along the axis of the roll. The recoil movement is guided by the pins 17 which are imbedded in journal members 18 and which allow for vertical play through runways or guides 19 provided in the arm 14.

The pressure roll is brought into engagement with the stitching roll by a foot operated lever mechanism 21. It is connected thereto by a vertical member 22 which is joined to the arm 14, by means of its bifurcated end 23 and a pin 24. A spring 25 connects the vertical member to the frame and is adapted to urge the pressure arm 14 to its inoperative position. The other end of the member 22 is pivotally connected to an arm 26 which is keyed to a shaft 27. A plurality of levers 28 are rigidly connected to the shaft 27 and carry a treadle 29.

The motor 7 is energized by a device shown at 35. It consists essentially of a glass tube partially filled with mercury and having suitable electric conductors sealed in both ends. When the tube is in an upright or slightly inclined position, the mercury will collect at one end; however, when the tube approaches a horizontal position, the mercury will flow across the gap and make electrical contact between the conductors. It will be seen that this provides an economical yet reliable starting mechanism. Thus when the operator is ready to stitch the ends of the bands, by merely bringing the pressure roll into position he automatically starts the motor. Moreover, as soon as the ends have been stitched by releasing the treadle 29, the spring 25 will raise the arm and the contact will immediately be broken.

It will be apparent that by practicing my invention it is unnecessary to make "books" or even bundles of "lined" ply stock. Furthermore, the operations have been materially simplified. The operator merely places the strips of superimposed fabric around the table 2, joins the ends thereof and operatively positions the pressure rolls 13 by applying pressure upon the treadle 29. The movement of the pressure roll toward a horizontal position energizes the motor and the fabric 3 is automatically forced between the rolls which stitch the union. Upon releasing the treadle, the arm 14 is raised and the motor is stopped. The finished band may then easily be removed.

From the description given, it is apparent that many variations of my invention may be practiced without departing from the principles which I have herein set fourth and, although I have described but one embodiment thereof, it is not so limited and I desire, therefore, that only such limitations shall be imposed as are consistent with the appended claims.

What I claim is:

1. In a band making machine, a supporting frame, a roller mounted thereon, a pivoted arm adapted to swing in the plane of the roller, a second roller mounted on the arm for engaging the first roller, power means for driving one of said rollers, means operated by movement of the arm for controlling the application of power to the driven roller, and means for operating the arm.

2. In a band making machine, a rigid frame, a driving stitcher roller mounted thereon, power means for driving said roller, a pressure roller pivotally mounted upon the frame to engage the driving roller, and means operated by movement of the pressure roller to control the transmission of power to the driving roller.

3. In a band making machine, a supporting frame, a power driven stitcher roller mounted thereon, a pressure roller mounted upon an arm pivoted to swing from a position in which the pressure roller engages the stitcher roll to a position in which the line of the axis of the pressure roll intersects the axis line of the stitcher roll, and means mounted upon the arm and controlled by the swinging thereof to control the transmission of power to the stitcher roller.

4. In a band making machine, a supporting frame, a power driven stitcher roller mounted thereon, an arm pivoted to the frame for swinging in the plane of the stitcher roller, a pressure roller mounted on the arm for engaging the stitcher roller, and operating pedal, connecting means associated with the pressure roller and pedal for swinging the pressure roller into operative or inoperative relation with respect to the stitcher roller and means operated by movement of the pedal for controlling the application of power to the stitcher roller.

5. In a band making machine, a supporting frame, a power driven stitcher roller mounted on said frame, an arm so pivoted adjacent one end of the driven stitcher roller as to swing in the plane of said roller, an operating pedal mounted on the frame, an operative connection between the pedal and the arm, a pressure roller mounted on the arm for engaging the stitcher roller, and means actuated by movement of the arm for controlling the transmission of power to the stitcher roller.

6. In a band making machine, a table upon which a band may receive preliminary manipulation, said table being so supported upon a single side that bands extending around it may be removed, a power driven stitcher roller mounted with its circumference approximately tangent to the surface of the table, an arm pivoted to swing vertically, a presser roller mounted on said arm to engage the stitcher roller, operating means associated with the arm, and means associated with the arm whereby the movement of the latter will control the application of power to the stitcher roller.

In witness whereof, I have hereunto signed my name.

ELOV F. MAAS.